(12) United States Patent
Nichols

(10) Patent No.: US 9,961,000 B2
(45) Date of Patent: May 1, 2018

(54) ESTIMATION OF NETWORK PATH SEGMENT DELAYS

(71) Applicant: Pollere Inc., Montara, CA (US)

(72) Inventor: Kathleen Marie Nichols, Montara, CA (US)

(73) Assignee: Pollere Inc., Montara, CA (US)

( * ) Notice: Subject to any disclaimer, the term of this patent is extended or adjusted under 35 U.S.C. 154(b) by 191 days.

(21) Appl. No.: 15/134,805

(22) Filed: Apr. 21, 2016

(65) Prior Publication Data

US 2016/0315860 A1 Oct. 27, 2016

Related U.S. Application Data

(60) Provisional application No. 62/153,498, filed on Apr. 27, 2015.

(51) Int. Cl.
| | | |
|---|---|---|
| *H04L 1/00* | (2006.01) | |
| *H04L 12/801* | (2013.01) | |
| *H04L 25/03* | (2006.01) | |
| *H04L 12/841* | (2013.01) | |
| *H04L 12/26* | (2006.01) | |
| *H04L 12/64* | (2006.01) | |

(52) U.S. Cl.
CPC ........ *H04L 47/11* (2013.01); *H04L 25/03859* (2013.01); *H04L 43/0852* (2013.01); *H04L 47/283* (2013.01); *H04L 2012/6489* (2013.01)

(58) Field of Classification Search
CPC ... H04L 47/11; H04L 43/0852; H04L 47/283; H04L 25/03859; H04L 2012/6489
See application file for complete search history.

(56) References Cited

U.S. PATENT DOCUMENTS

| | | | |
|---|---|---|---|
| 7,787,438 B2 | 8/2010 | Dowse | |
| 2008/0151771 A1* | 6/2008 | Dowse | ............... H04L 43/0858 370/252 |
| 2009/0276542 A1* | 11/2009 | Aweya | .................. H04J 3/0667 709/248 |
| 2012/0026869 A1* | 2/2012 | Wang | .................. H04L 41/5003 370/230 |

(Continued)

OTHER PUBLICATIONS

Bryan Veal et al, "New Methods for Passive Estimation of TCP Round-Trip Times," PAM'05 Proceedings of the 6th International Conference on Passive and Active Network Measurement, 2005, pp. 121-134; 14 pages.
C. Chirichella et al, "Passive Bufferbloat Measurement Exploiting Transport Layer Information," IEEE Global Communications Conference, 2013; 6 pages.

(Continued)

*Primary Examiner* — Clemence Han
(74) *Attorney, Agent, or Firm* — Atesa Legal PLLC

(57) ABSTRACT

A method for estimation of a network path segment delay includes determining a scaled time stamp for each packet of a plurality of packets by scaling a time stamp for each respective packet to minimize a difference of at least one of a frequency and a frequency drift between a transport protocol clock of a host and a monitoring point. The time stamp for each packet is provided by the transport protocol clock of the host. A corrected time stamp for each packet is determined by removing from the scaled time stamp for each respective packet, a temporal offset between the transport protocol clock and the monitoring clock by minimizing a temporal delay variation of the plurality of packets traversing a segment between the host and the monitoring point.

17 Claims, 8 Drawing Sheets

(56) References Cited

U.S. PATENT DOCUMENTS

| | | | | |
|---|---|---|---|---|
| 2012/0269204 A1* | 10/2012 | Zampetti | ............... | H04J 3/0667 370/503 |
| 2013/0100832 A1* | 4/2013 | Flinn | ................... | H04L 43/0852 370/252 |
| 2014/0068315 A1* | 3/2014 | Aweya | ....................... | G06F 1/04 713/503 |
| 2014/0213193 A1* | 7/2014 | Zhang | .................... | G01S 11/02 455/67.11 |
| 2015/0092794 A1* | 4/2015 | Aweya | .................. | H04J 3/0667 370/503 |
| 2015/0163000 A1* | 6/2015 | Aweya | .................. | H04J 3/0602 370/519 |
| 2016/0095075 A1* | 3/2016 | Bin Sediq | ........... | H04W 56/001 370/350 |
| 2016/0170437 A1* | 6/2016 | Aweya | .................. | H04J 3/0667 713/503 |
| 2016/0330012 A1* | 11/2016 | Liu | ....................... | H04J 3/0664 |

OTHER PUBLICATIONS

C. Demichelis et al, "IP Packet Delay Variation Metric for IP Performance Metrics (IPPM)," Association for Computing Machinery (ACM), Network Working Group, Standards Track, No. 3393, Nov. 2002, 21 pages.

Cesar Marcondes et al, "Regenerating TCP Dynamics From Traces Path Characteristics," Testbeds and Research Infrastructure for the Development of Networks and Communities, TridentCom 2007, 3rd International Conference on, 2007; 8 pages.

Stephen D. Strowes, "Passively Measuring TCP Round-trip Times," ACMQUEUE Magazine, vol. 11, Issue 8, 2013; 12 pages.

Sue B. Moon et al, "Estimation and Removal of Clock Skew From Network Delay Measurements," INFOCOM '99, Eighteenth Annual Joint Conference of the IEEE Computer and Communications Societies, vol. 1, 1999; 8 pages.

Vern Paxson, "On Calibrating Measurements of Packet Transit Times," ACM SIGMETRICS Joint International Conference on Measurement and Modeling of Computer Systems, 1998; 13 pages.

* cited by examiner

Determining A Temporal Offset

Determining A Scaling Function

ESTIMATION OF NETWORK PATH SEGMENT DELAYS

CROSS-REFERENCE TO RELATED APPLICATIONS

This application is a utility application claiming priority to U.S. Provisional Application Ser. No. 62/153,498 filed on Apr. 27, 2015 entitled "METHOD OF ESTIMATION OF NETWORK PATH SEGMENT DELAYS," the entirety of which is incorporated by reference herein.

GOVERNMENT RIGHTS IN THE INVENTION

This invention was made with government support under Grant No. DE-SC0009498 awarded by the Department of Energy. The government has certain rights in the invention.

FIELD OF THE INVENTION

The present invention relates generally to network delay measurement. More specifically, the invention relates to delay estimation using passively obtained packet information.

BACKGROUND

Determination of network delays has been important since the early days of packet networking. When data transfers exceed the expected time or are delayed so much as to impair utility, network operators and network users have sought ways to track down that delay. As network usage has evolved to include more delay sensitive applications, monitoring network delay has become increasingly important.

The delay experienced by a packet traversing a network consists of intrinsic delay, the minimum time packet transport takes, and queuing delay, the time spent waiting for resources due to other packets in the network. Queuing delay is a measure of a network's congestion and thus an important metric to users and operators of networks. Current approaches to estimating and isolating network delays rely on one or more of the following: injecting additional active measurement traffic into the network, sophisticated clock synchronization, or the ability to capture and pair packets traveling in both directions between endpoints. These approaches have drawbacks that include perturbing the actual delay, requiring additional hardware, implementation complexity, being unusable where both directions of a communication are not readily available, and being unable to continuously monitor the actual delays experienced by network packets.

Most delay estimation approaches inject packets into a network (e.g. "active measurement") or require cooperation of two communicating entities. Active measurement impacts the quantity it is attempting to measure by adding more traffic to the network, which generally increases delay. Further, this only samples the delay based on the network conditions experienced by the injected packet and thus the sampling methodology is important. To minimize network and host impact, active measurement is usually carried out for brief periods of time, generally when a problem is being experienced. Passive techniques can run continually and data can be examined over a range of conditions and times of day.

Passive techniques for estimating the round-trip delay between two communicating end points have long been included with network transport protocols. The round-trip delay only needs to rely on the clock at one end point, so no clock synchronization is needed. These estimates are used internally to a particular host's transport protocol and are not used as general estimates of network delay.

The problem of passively estimating the path segments within the round trip is more complicated due to clock offsets, drift, and skew. Current approaches include synchronized clocks using hardware, which can be quite complex and limits deployment and use of Network Time Protocol, which can lack precision and requires cooperating endpoints. Passive measurements that require cooperating endpoints are limited to measuring network paths between those end-points and these may not include the delays that were impacting a particular use of the network. Passive techniques for determining path segment delay exist that depend on matching specific bidirectional packet pairs of the flow. Packet pairing techniques are vulnerable to packet loss and multipathing and must be deployed where both directions of a flow are forced to pass.

BRIEF SUMMARY

As will be appreciated, embodiments as disclosed include at least the following. In one embodiment, a method for estimation of a network path segment delay comprises determining a scaling function to minimize a difference of at least one of a frequency and a frequency drift between a transport protocol clock of a first host and a monitoring clock of a monitoring point. The transport protocol clock provides a first time stamp for each packet of a plurality of packets. The first time stamp for each packet marks a temporal event of each packet at the first host. The first time stamp for each packet is scaled with the scaling function to determine a first scaled time stamp for each respective packet. A temporal offset between the transport protocol clock and the monitoring clock for each packet is determined by minimizing a temporal delay variation of the plurality of packets traversing a first segment between the first host and the monitoring point. The temporal offset for the first scaled time stamp for each packet is removed to determine a first corrected time stamp for each respective packet. For each packet, the network path segment delay between the first host and the monitoring point is estimated by subtracting a first arrival time at the monitoring point for each packet from the first corrected time stamp for each respective packet.

Alternative embodiments of the method for estimation of a network path segment delay include one of the following features, or any combination thereof. The scaling function is a linear fit to a time variant function of a ratio of a rate of the monitoring clock divided by a rate of the transport protocol clock. The transport protocol clock is marked as being unusable for estimating the network path segment delay in response to the time variant function deviating from the linear fit by a usability threshold. The first arrival time at the monitoring point for each packet is stored using a respective hash table key formed by combining a source address, a destination address, and an identifier field of each respective packet transmitted from the first host. The first arrival time at the monitoring point for each packet is stored using a respective first hash table key formed by combining a source address, a destination address, and the first time stamp of each respective packet transmitted from the first host; a second packet from a second host is transmitted in response to the second host receiving a one of the plurality of packets from the first host, the second packet traversing a second segment between the second host and the monitoring point, the second packet including the respective first time stamp of the one of the plurality of packets from the first host and a second time stamp marking a departure of the second packet from the second host; and the first arrival time at the monitoring point of the one of the plurality of packets transmitted by the first host is retrieved from the second packet, by using a second hash table key formed by combining the second time stamp with the transposition of a source address of the second packet and a destination address of the second packet. Estimating for each packet, the network segment delay comprises one of estimating the network path segment delay of a first path spanning from the monitoring point to the second host, by subtracting the first arrival time at the monitoring point of the one of the plurality of packets from a corrected second time stamp, the first arrival time being retrieved by using the second hash table key; estimating the network path segment delay of a second path spanning from the first host to the second host, by subtracting the corrected first time stamp of the one of the plurality of packets from the corrected second time stamp; estimating the network path segment delay of a third path spanning from the second host to the monitoring point, by subtracting the corrected second time stamp of the one of the plurality of packets from a second arrival time at the monitoring point of the second packet transmitted by the second host; and estimating the network path segment delay of a fourth path spanning from the first host to the second host and from the second host to the monitoring point, by subtracting the second arrival time from the corrected first time stamp. Estimating for each packet, the network segment delay wherein the first time stamp for the one of the plurality of packets from the first host is replaced with a virtual time stamp in response to the transport protocol clock of the first host being unusable for estimating network path segment delays, the network path segment delay of the second path measuring a second virtual delay from the monitoring point to the second host, and the network path segment delay of the fourth path measuring a fourth virtual delay from the monitoring point to the second host and from the second host to the monitoring point. The temporal offset is determined by minimizing the temporal delay variation from a sample of the plurality of packets. The temporal offset is updated when a new packet from the plurality of packets provides a temporal delay variation being less than a previous temporal delay variation. The temporal offset is determined by interpolating between a plurality of minimized temporal delay variations, wherein each temporal delay variation corresponds to a different packet size. The temporal offset is determined by minimizing the temporal delay variation of the plurality of packets traversing the first segment and a second segment between the monitoring point and a second host. The plurality of packets is buffered with a storage buffer. The network path segment delay is compressed with previously stored network path segment delays. A queuing delay is determined by subtracting a transit delay from the network path segment delay, the transit delay being a minimum of a previously stored network path segment delay.

In another embodiment, a monitoring point device for estimation of a network path segment delay comprises a delay estimator configured to determine a scaled time stamp for each packet of a plurality of packets by scaling a time stamp for each respective packet to minimize a difference of at least one of a frequency and a frequency drift between a transport protocol clock of a host and a monitoring clock of a monitoring point, the time stamp for each packet provided by the transport protocol clock; determine a corrected time stamp for each packet by removing from the scaled time stamp for each respective packet, a temporal offset between the transport protocol clock and the monitoring clock by minimizing a temporal delay variation of the plurality of packets traversing a segment between the host and the monitoring point; and estimate the network path segment delay between the host and the monitoring point by subtracting an arrival time at the monitoring point for each packet from the corrected time stamp for each respective packet. A network interface card connects the delay estimator to a network, the network is configured to transport a plurality of packets the host to the monitoring point.

Alternative embodiments of the monitoring point device for estimation of a network path segment delay include one of the following features, or any combination thereof. The monitoring point device comprises at least one of a second host, a modem, and a router. A packet monitor is configured to determine a usability of each packet for estimating network path segment delays including verification of an identifier field for each packet. The monitoring point device for estimation of a network path segment delay includes a network manager, a compression module and a storage device, the network manager is configured to determine from the delay estimator a number of network path segment delay estimates for the plurality of packets, to control the compression of network path segment delay estimates with the compression module when the number exceeds a threshold, and to control the storage of the network path segment delay estimates with the storage device. The delay estimator is coupled to the monitoring point.

In another embodiment, a method for estimation of a network path segment delay comprises determining a first scaled time stamp for each packet of a plurality of packets by scaling a first time stamp for each respective packet to minimize a difference of at least one of a frequency and a frequency drift between a transport protocol clock of a first host and a monitoring clock of a monitoring point, the first time stamp for each packet provided by the transport protocol clock of the first host. A first corrected time stamp for each packet is determined by removing from the first scaled time stamp for each respective packet, a temporal offset between the transport protocol clock and the monitoring clock by minimizing a temporal delay variation of the plurality of packets traversing a first segment between the first host and the monitoring point. A first arrival time at the monitoring point for each packet is stored using a respective first hash table key formed by combining a source address, a destination address, and an identifier field of each respective packet transmitted from the first host. A second packet from a second host is transmitted in response to the second host receiving a one of the plurality of packets from the first host, the second packet traversing a second segment between the second host and the monitoring point, the second packet including the respective first time stamp of the one of the plurality of packets from the first host and a second time stamp marking a departure of the second packet from the second host. The first arrival time at the monitoring point of the one of the plurality of packets transmitted by the first host is retrieved from the second packet, by using a second hash table key formed by combining the second time stamp with the transposition of a source address of the second packet and a destination address of the second packet. Estimating for each packet, the network path segment delay comprising one of estimating the network path segment delay of a first path spanning from the monitoring point to the second host, by subtracting the first arrival time at the monitoring point of the one of the plurality of packets from a corrected second time stamp, the first arrival time being retrieved by using the second hash table key; estimating the network path segment delay of a second path spanning from the first host to the second host, by subtracting the corrected first time stamp of the one of the plurality of packets from the corrected second time stamp; estimating the network path segment delay of a third path spanning from the second host to the monitoring point, by subtracting the corrected second time stamp of the one of the plurality of packets from a second arrival time at the monitoring point of the second packet transmitted by the second host; and estimating the network path segment delay of a fourth path spanning from the first host to the second host and from the second host to the monitoring point, by subtracting the second arrival time from the corrected first time stamp.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Embodiments of systems and methods described herein provide for the passive capturing of packets transmitted across a network without introducing network perturbations, complex clock synchronization methods, or restricting the segments that can be monitored, amongst other advantages. Host network transport protocol clocks are scaled and offsets removed to resolve time stamps introduced into the packet at the host to a passive monitoring point clock. Consequently, the monitoring point provides a number of delay measurements between one or more hosts or the monitoring point aligned to, and with the accuracy of, the monitoring point clock.

An approach to the estimation of network delay and its variation that can isolate path segments with passive, single-point packet monitoring and is robust in the presence or absence of both directions of packet communications, continuously monitors actual packet delays experienced, self corrects for clock skew and drift and does not rely upon complex hardware can be widely deployed without impacting network behavior. In one embodiment of the present invention, packets traversing the network are monitored and then delays and delay variations experienced by network traffic are estimated for multiple segments of the network based on information from the packet combined with timing information at the monitoring point. Delay variation estimates can be obtained for multiple path segments when a single direction is available and can be enhanced by information from the opposite direction to include more path segments and path segment delays.

The teachings herein relate to estimation of one or more segments of network path delay based on samples of the network packet stream obtained at a single point. A simple and robust method infers path delay behavior based on a novel identification of packet information and extraction of information collected passively at a single point. To overcome the current limitations and make delay estimation widely deployable and continual, there is a need for an approach to detecting delay and delay variation in real-time, using single-packet-based passive data collection that doesn't require clock synchronization or end point cooperation, can be deployed anywhere including network routers and network hosts, can provide information even from single point measurements and does not depend on pairing packets from both directions of a network transport connection.

Figure 1:
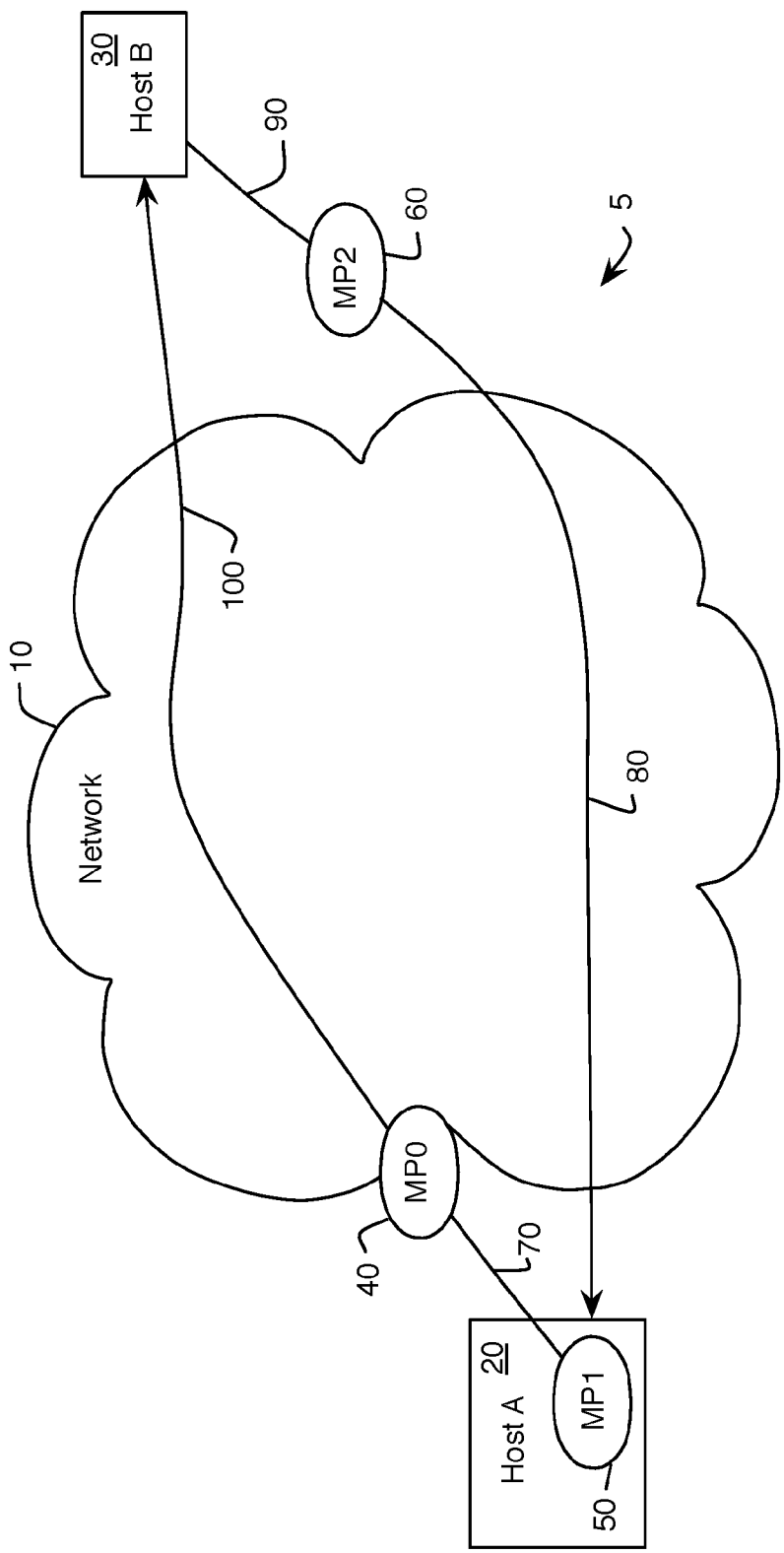
FIG. 1 is a schematic view of an embodiment of a network system illustrating several example locations for monitoring points with associated network path segments.

Turning now to the drawings, in which like reference characters indicate corresponding elements throughout the several views, attention is first directed to FIG. 1 in which the environment where an embodiment 5 of the present disclosure can be employed is illustrated. This embodiment 5 is deployed in a network-attached device that continuously monitors the packet stream to create a constantly updated estimate of the segment delays versus time. One embodiment is combined with network monitoring hardware and software in a programmable device, which can be deployed anywhere in a network. In FIG. 1, a Network 10 includes the Internet, Host A 20, and Host B 30, which are communicating through the network. In various embodiments, Monitoring Points (MP) are deployed throughout this architecture—for example, MP0 40, MP1 50, and MP2 60. MP1 50 is implemented in a network host (e.g. a general purpose computer that is connected to a network) and views all the packet traffic into and out of HostA 20. MP2 60 is implemented in modem that attaches HostB 30 to the larger Network 10 and accesses the packet traffic from HostB 30 into the network 10. MP0 40 is implemented in a network routing element that receives the data from HostA 20.

With reference to FIG. 1 and MP0 40, an example embodiment uses information from the data packets sent by HostA 20 to HostB 30 to compute the delay experienced on three distinct segments of the network path used by a data transport connection between the Hosts: the path segment traversing 70, the path segment traversing 90 then 80, and the path segment traversing 90, 80, 20, and 70 in that order. In various embodiments, MP1 50 uses packet data sent by HostB 30 to HostA 20 to compute delay on the path consisting of 90 then 80, the path consisting of 70 then 100, and the path consisting of 70, 100, 30, 90, and 80 in that order. In other embodiments, MP2 60 uses packet information from HostB 30 to HostA 20 to compute the delay experienced on the path segment traversing 90, the path segment traversing 70 then 100, and the path segment traversing 70, 100, 30, and 90 in that order.

Figure 2:
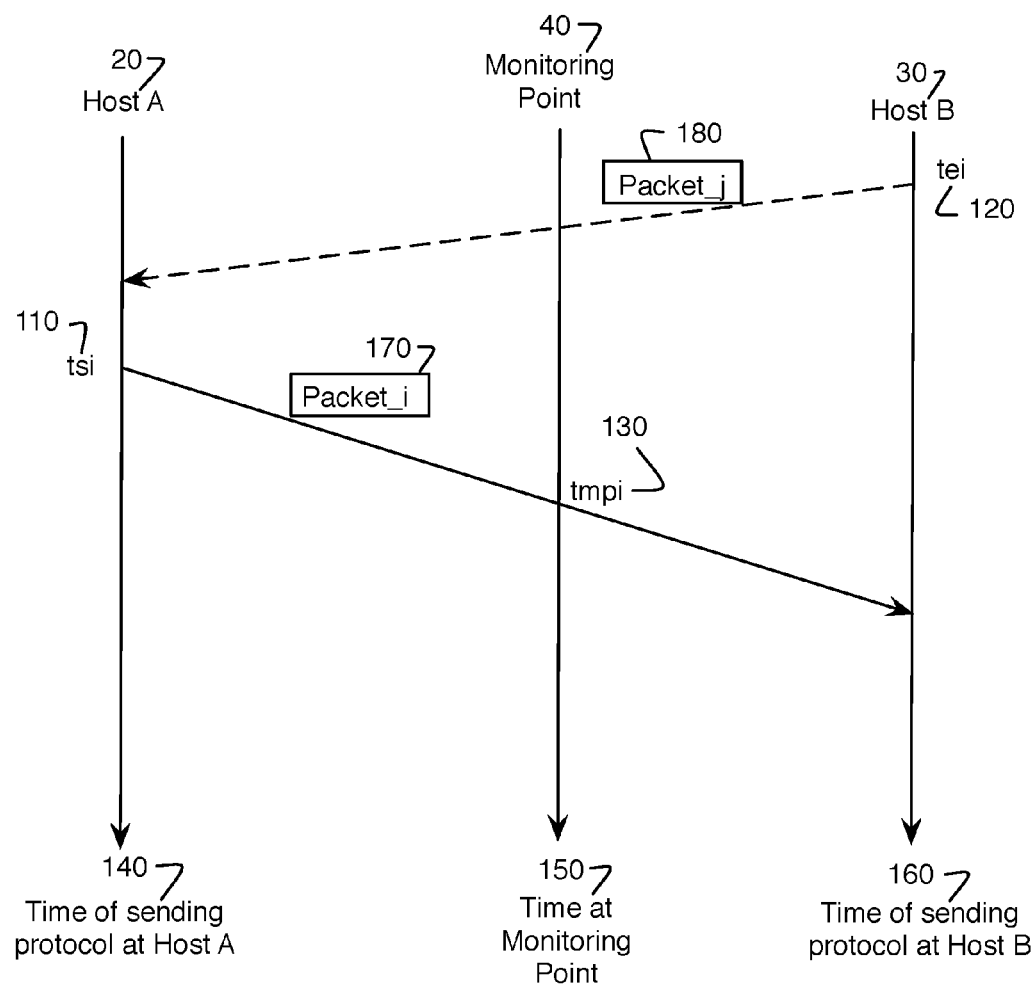
FIG. 2 is a graphical view of the time values associated with packets transported between the hosts of FIG. 1.

Turning to FIG. 2, one example embodiment uses three sample measurements associated with each transport packet as shown on a depiction of the timelines associated with each sample. In many embodiments, a packet arriving from one of a pair of communicating hosts causes the other host of the pair to send a packet and this response will include the time stamp from the causal packet as well as the sending host's time stamp. In FIG. 1 and FIG. 2, HostA 20 and HostB 30 illustrate such a communicating pair with causal Packet_j 180 carrying time stamp 120 and resulting in Packet_i 170 with time stamp 110. Focusing on Packet_i 170, which is sent by HostA 20 to HostB 30, the first measurement is tsi 110, which comes from a timestamp placed in the packet by the sending protocol at Host A 20 so is from timeline 140. Further, tsi 110 is the arrival time of Packet_j 180 at HostA 20 on timeline 140. The second measurement is tei 120, which is the time stamp received at HostA 20 from Packet_j 180. This time stamp was placed in packet 180 by HostB 30 so is on the timeline 160 associated with the sending protocol at HostB 30. The final measurement is tmpi, which is the time that Packet_i 170 arrives at the monitoring point and is from the timeline 150 associated with the monitoring point device.

In FIG. 2, Packet_i arriving at MP0 40 has two timestamps and a time measurement associated with it: tsi is on timeline 140 at HostA 20 at the time it sent Packet_i, tei 120 is on timeline 160 at HostB 30 at the time it sent Packet_j 180, and tmpi 130 is on timeline 150 at MP0 40. If all three timelines were identical, a single packet's three measurements would yield three path segment delays estimates. Denoting the estimate due to packet number "i" on a particular segment as Delay_i(segment) then:

$$\text{Delay}\_i(70) = tmpi - tsi:$$

$$\text{Delay}\_i(90 \text{ to } 80) = tsi - tei$$

$$\text{Delay}\_i(90 \text{ to } 80 \text{ to } 20 \text{ to } 70) = tmpi - tei \quad \text{[Equation 1]}$$

In various embodiments, samples are collected over time and observed minimum values are recorded for each path segment. The minimum value is then used as an estimate of intrinsic delay and any additional delay will be attributed to the queuing delay.

In practice, the timelines are not identical because their respective clocks are generally not identical. Compared to a reference time like global standard clock, each clock is likely to have a different offset, or constant additive value to align the time to the reference time. In some cases an additional clock offset (e.g. skew) is introduced due to clock slewing (e.g. the transition time between states). In addition, different clock frequency and frequency drift are commonly observed over time. Clock drift is mostly due to thermal variation over time scales on the order of an hour or more but skew changes can show up over shorter time periods. This disclosure focuses on obtaining the variable portion of delay, the queuing delay, under realistic conditions of differing clock offsets and skew.

To understand the information contained in the packet time stamps under realistic assumptions, the delay estimate can be broken into its component parts, transit, which is the minimum delay on a path segment, and queuing seen by the "i" numbered sample packet. The transit delay includes the time it takes a packet to traverse a segment, wired or wireless, and thus has a dependence on packet size:

$$\text{Delay}\_i(70) = \min\_dly(70, size\_i) + qdly\_i(70)$$

Using equation (1) and adding the offset of the HostA 20 clock with respect to the monitoring point clock to get on the same timeline:

$$tmpi - (tsi + \text{offset}\_i(\text{HostA})) = \min\_dly(70, size\_i) + qdly\_i(70)$$

Focusing on one packet size and one path segment, the clock offset and the intrinsic delay are constant, so:

$$qdly\_i(70) = tmpi - tsi - \text{offset}\_i(\text{HostA}) - \min\_dly(70, size\_i)$$

Figure 3:
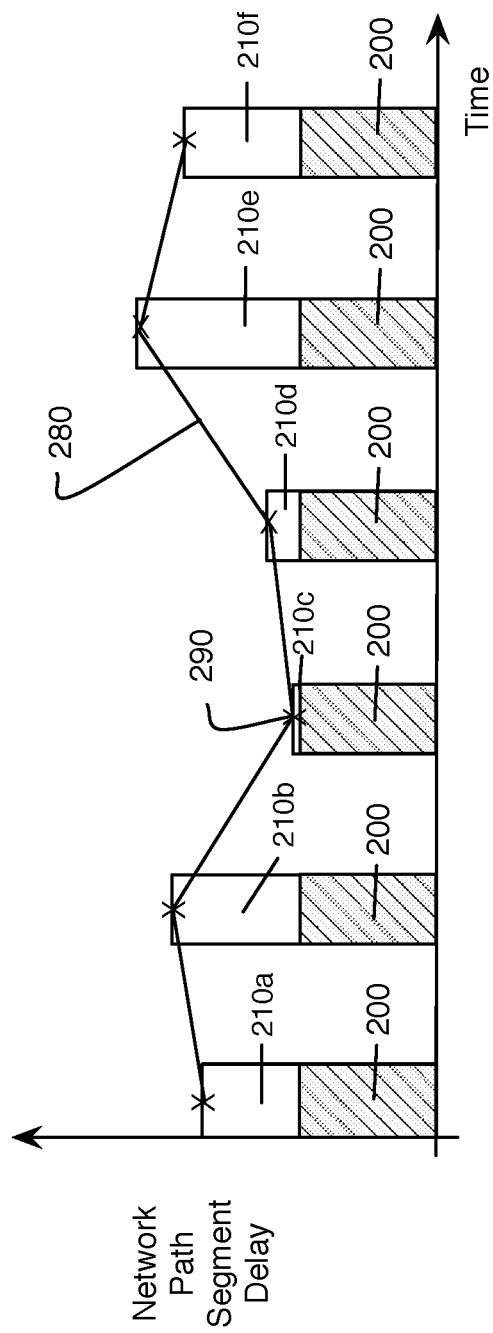
FIG. 3 is a graphical view of a series of network path segment delay measurements showing a temporal delay variation.

Referring to FIG. 3, a method for determining a temporal offset (e.g. a clock offset) is shown. A series of network path segment delays are determined over time. In the example shown in FIG. 3, six path delay determinations are shown with substantially the same packet size transported across a path of one or more segments. Each transported packet has substantially the same transit delay 200, however in other examples, different packet sizes have different transit delays. The six shown path delays (e.g. for six transported packets) each have a respective queuing delay 210a, 210b, 210c, 210d, 210e and 210f, (generally 210), in addition to their respective transit delay 200. A temporal delay variation 280 is minimized to determine a temporal offset 290, corresponding in this example to the third path delay with a minimal queuing delay 210c. In other embodiments, the minimal queuing delay 210c is zero, however in other embodiments, a delay 210c of substantially zero is achieved.

In various embodiments, the temporal offsets are determined as the values that make the smallest observed delay variations come out to zero so that the minimum observed values are taken to be transmissions where there is no queuing. This can underestimate queuing delay if the queuing is so persistent that a sample with no queuing is never observed. A good estimate of the minimum delay on a path segment is obtained by taking the minimum from a history of samples. In an alternative embodiment, the first determined minimal value is used, and then updated if a smaller value is found. As the minimum transit delay depends on packet size, one embodiment keeps a history of the minimums at each packet size and interpolates when necessary. In many embodiments, packet sizes of an individual packet transport flow rarely vary, or vary only by a small amount, thus reducing the need to keep track of transit delay as a function of packet size. Furthermore, in transit delays differences between the smallest and largest packet sizes is generally less than the precision of the delay estimates at transmission rates at or above 10 Megabits per second.

Similarly to the computation of path segment 70, the delay variation on the HostB 30 to HostA 20 path segment 80 can be computed:

$$qdly\_i(90 \text{ to } 80) = tsi - tei - (\text{offset}\_i(\text{HostA}) - \text{offset}\_i(\text{HostB})) - \min\_dly(90 \text{ to } 80, size\_j)$$

where offset_i(Host) is the offset of the host's clock with respect to that of the monitoring point host. For this delay variation estimate, the transit delay is a function of the size of the causal packet 180 that caused the resulting Packet_i to be sent. Because this packet size is not generally available at the monitoring point, the quality of this estimate could be affected at lower transmission rates (following the discussion above). In some embodiments, the size can be estimated from transport dynamics or packets can be paired if both directions are available.

Following the same approach, the delay variation on the path segment 90 to 80 through 20 to 70 can be estimated as:

$$\text{Delay}\_i(90 \text{ to } 80 \text{ through } 20 \text{ to } 70) = tmpi - tei - \text{offset}\_i(\text{HostB}) - \min\_dly(90 \text{ to } 80 \text{ through } 20 \text{ to } 70, size\_i, size\_j)$$

The dependence of this delay variation on two different packet sizes makes it a noisier, or poorer quality, value at low transmission rates, though estimation and packet pairing could be used to improve the accuracy.

The above allows delay variation estimates to be computed based on single packet samples and includes removing the potentially different clock offsets. For most deployments, there are further adjustments necessary to resolve samples tsi 110 and tei 120 to the timeline at the monitoring point 150. First, note that use of the transport time stamps means estimating the transport protocol clock used at a host, not the actual host's clock. In most cases, the transport protocol clock is of a coarser precision than the monitoring host clock, (e.g. values are in milliseconds rather than microseconds or nanoseconds). Additionally, some transport protocol clocks will not have a linear relationship to their own host clock or to the monitoring host clock.

Compared to a global reference clock, the amount of time represented by each increment of the timeline clocks may differ. Further, the timeline clocks can skew and drift differently and can have different offset values. Thus, all timeline samples must be resolved to the same clock, with removed differences in the clock frequencies, frequency drift, offset values and offset skew. In one embodiment, the sending protocol timelines are generally at a lesser precision than the monitoring point clock 150 so all timelines are resolved to the monitoring point clock. Timeline 140 differs from 150 even when the monitoring point is co-located with the sending host (e.g. Host A 20).

In various embodiments, a relationship between the host protocol clock and the monitoring point clock is determined by keeping a history of the samples and using algorithms to determine their relationship, (e.g. using a linear fit algorithm). When a sample sufficiently deviates from a linear fit, (e.g. a lack of a quantifiable relationship to the other samples), the sample is deemed to be unusable or a "bad" clock. This approach is used to compute a function, f(tsi), that resolves the host protocol clock to the monitoring host clock and can be as simple as a multiplicative factor, or line slope for the case of a linear fit.

$$qdly\_i(70) = tmpi - f(tsi) + \text{offset}\_i(\text{HostA}) - \min\_dly(70, size\_i)$$

Figure 4:
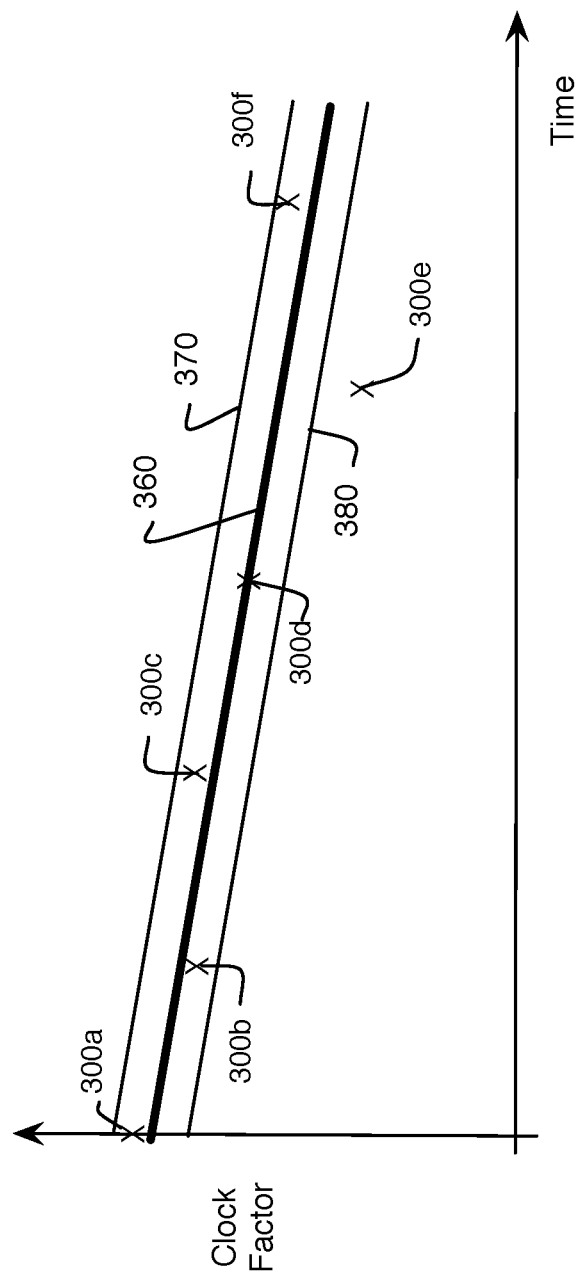
FIG. 4 is a graphical view showing a linear fit to a series of clock factor data points.

Turning to FIG. 4, a method for determining a scaling function is shown. A clock factor is determined for a series of transported packets, where the clock factor represents a rate of the monitoring point clock divided by a rate of the transport protocol clock of a host. Shown are six clock factor determination 300a, 300b, 300c, 300d, 300e and 300f, (generally 300). A linear fit 360 is determined through the clock factor determinations 300. One clock factor 300e is determined to be outside an acceptable tolerance of the linear fit as defined by an upper usability threshold 370 and a lower usability threshold 380. Accordingly, the host protocol clock used to determine the clock factor 300e is deemed to be unusable for estimating network path segment delays over the path used to determine the clock factors 300.

As the monitoring interval increases, offset skew becomes more significant. The effect of skew shows itself as a shift, either downward or upward slope, in the overall trend of the temporal delay variations 280 (see FIG. 3), as skew causes the host protocol clock to depart from the monitoring point clock. The effect of skew can be removed either over a collected interval of estimates or as a value updated with each sample, or set of samples, to obtain the slope "m" of the skew over a collection interval or portion of a collection interval. The final delay variation estimate can be computed as:

$$dv\_i(70) = m*70 \times qdly\_i(70)$$

Figure 5:
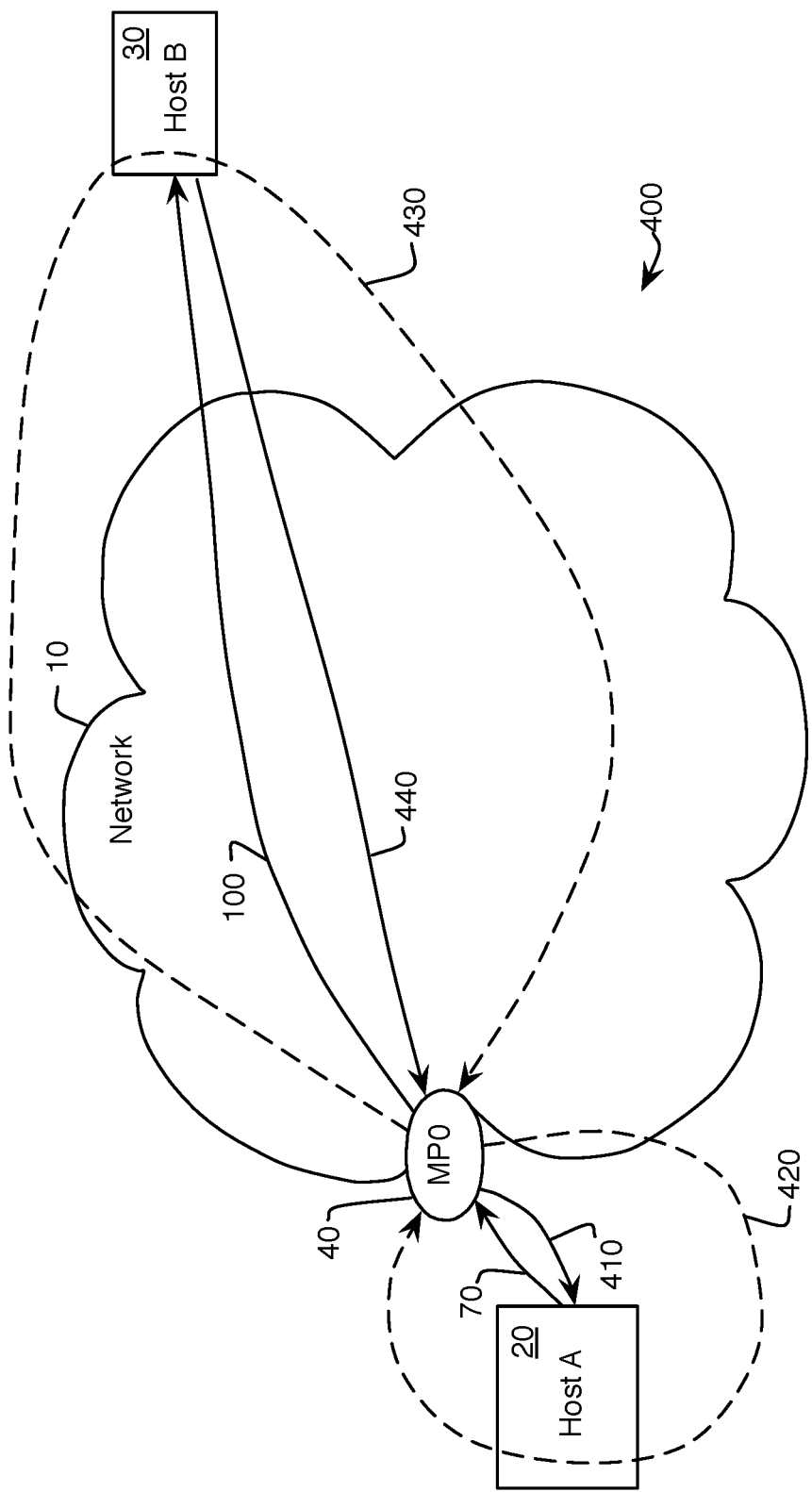
FIG. 5 is a schematic view of an embodiment of a bidirectional network system illustrating several example locations for monitoring points with associated network path segments.

When both directions of a network data transport protocol are available, three additional delay variation estimates are obtained. In one embodiment, these include three additional segments, in addition to the three described for FIG. 1. Referring to the embodiment 400 of FIG. 5, causal packets are sent from HostB 30 to HostA 20, and from HostA 20 to HostB 30, thus covering segments that constitute the entire round trip path between HostA 20 and HostB 30. For example packets are sent from HostB 30 to MP0 along segment 100, and continue to HostA 20 along segment 410. Packets are sent from HostA 20 to MP0 40 along segment 70, and continue to HostB 30 along segment 100. A round trip delay from MP0 40 through HostA 20 and back to MP0 40 is measured along segment 420. A round trip delay from MP0 40 through HostB 30 and back to MP0 40 is measured along segment 430. In one embodiment, the round trip delay along segment 420 (and similarly for the segment 430) is determined by "pairing" a packet that travelled from MP0 40 to the host (e.g. Host A 20) with a packet that travelled from the same host (e.g. Host A 20) back to MP0 40.

Another embodiment requires pairing information from a packet with information saved from the reverse flow and can permit the computation of delay variation values for hosts with unusable ("bad") clocks as well as enabling the computation of delay variation from MP0 40 to HostA 20 (e.g. segment 410 in FIG. 5), or from MP0 40 to HostB (e.g. segment 430). For both purposes, a "virtual" or pseudo time stamp is created when a packet arrives at the measurement point. A packet field or multiplicity of fields is used as a key, (e.g. employing hashing algorithms), to save the arrival time of the packet at the measurement point—for example, tmpj 500 of Packet_j 180. In one embodiment, the packet timestamp is used as the key value. When Packet_i 170 arrives from the other direction (e.g. opposing the direction that Packet_j 180 followed), the key value is extracted. In one embodiment the extracted key value is the "timestamp echo," and is used to retrieve the virtual time stamp 500. In the case where HostB 30 in FIG. 6 has an unusable clock, (although tei 120 may be unusable as a measure of time), tei 120 serves as an indicator to give the "virtual" time stamp 500 and use it instead. This yields delay variations relative to MP0 40 rather than HostB 30. In the case where the delay variation of segment 410 is being computed, the echo value may be good, but since the delay variation from MP0 to HostA is desired, it is computed as:

$$dvi(410) = vtsi - tsi$$

There may be multiple candidate packet pairs and the preferred choice can be further selected based on information known about the specific transport protocol being observed or additional fields from the packet, (e.g. sequence numbers). One embodiment simply pairs the first occurrence of the key in each direction. Errors introduced by missing the "best" pair are generally small compared to the delay variations being estimated. In one example, subsequent to Host A 20 sending the resulting packet 170, a subsequent Packet_i+1 520 is sent from Host A 20 with a timestamp tsi+1 510.

Figure 6:
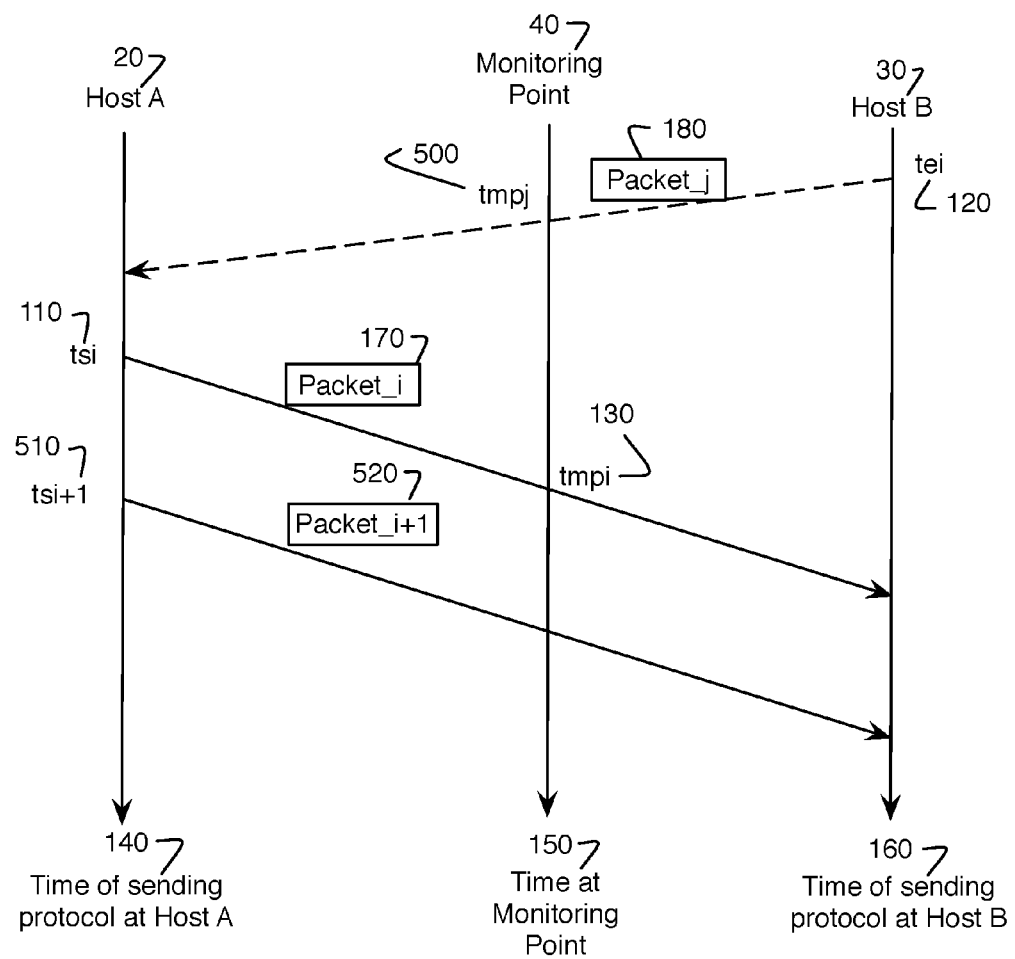
FIG. 6 is a graphical view of the time values associated with packets transported between the hosts of FIG. 5.

In one embodiment, information from the packet header that denotes the packet's flow (e.g. source, destination, and ports) is combined with the sending host's time stamp value to create a key to the arrival time of the packet. In another embodiment, only the packet's source, destination and sending host's time stamp value is used to create the key. For example, in FIG. 6, packet_j's flow information and sending host time tei 120 are used as a key to store the arrival time tmpj 500. The packet header flow information is arranged to denote the reverse flow (e.g., transposing the destination for the source) with the returned host timestamp (e.g. the "echo" value) as a key to retrieve the saved arrival time, if any. In FIG. 6, Packet_i 170 will return tei and the key resulting from combining this with reversing the packet's source and destination fields will yield the saved time tmpj which can be subtracted from 170's arrival time tmpi 130 to give an estimate of the network round trip time from MP0 40 to HostA 20. At the same time, Packet_i 170's header flow information can be combined with tsi 110 to save the arrival time tmpi 130. The use of the packet's host time stamps as an identifier rather than a time value permits a known, precise clock (e.g. that of the monitoring point) to be used to measure network delays without requiring clock synchronization or any of the offset and skew removal as described for the delay variation measurements.

Finally, when both directions are available, it is possible to compute a "virtual" time stamp to use in place of time stamp values of unusable ("bad") clocks. Similar to the approach used to compute the round trip delay, if HostB 30 in FIG. 6 has an unusable clock, the arrival time tmpj 500 of Packet_j 180 can be stored and then accessed by Packet_i 170. Although tei 120 may be unusable as a measure of time, it can still serve as an indicator to give the "virtual" time stamp 500. This yields delay variations relative to MP0 40 rather than HostB 30.

Figure 7:
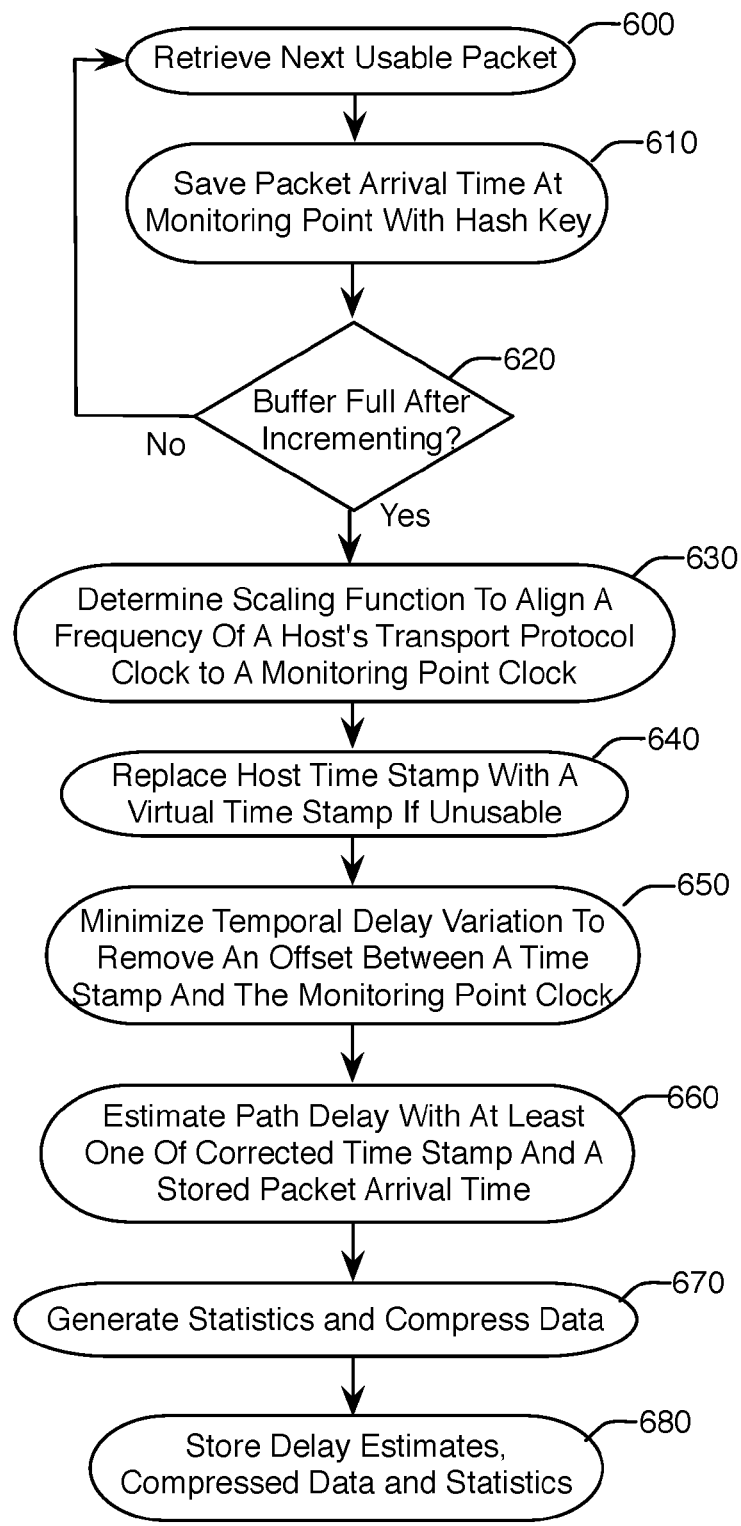
FIG. 7 is a flowchart representation of an embodiment of a method for estimating network path segment delays in accordance with an embodiment of the present disclosure.

FIG. 7 presents an embodiment of a method for estimating network path segment delays. Network packets are accepted at 600 from a network. The packets at 600 are filtered by a packet monitor to ensure that each packet is usable, and pertinent packet information is stored. In one example, pertinent information includes tei 120, and the packet arrival tmpi 130 at the monitoring point (using a hash table key). In one embodiment, the packet data is stored at 600 using a data structure or "buffer." In another embodiment, only a packet header is stored at 600. In another embodiment, only a subset of pertinent information from the packet header is stored at 600, (e.g. time stamps and information required for the hash table). Other storage devices are envisioned within the scope and spirit of this disclosure.

At 610 the arrival time at the monitoring point of the next usable packet is saved with a hash key. In one embodiment, the hash table key is formed by combining the packet source address, destination address and the timestamp from the host that last transmitted the packet. In other embodiments, the hash key is formed by combining the Internet source and destination addresses of the packet, the protocol source an destination port numbers, and the timestamp from the host. In another embodiment, the timestamp used to form the hash key is replaced with an identifier field including one of a sequence number and a timestamp. At 620, the buffer is incremented and tested to determine if the buffer is full. If the buffer is not full, the method returns to 600 to collect additional packets in a new empty buffer, while the previous buffer is processed. If the buffer is full, the method proceeds to 630. In another embodiment the test for a full buffer is replaced with testing for a packet collection time interval exceeding a preset value. In another embodiment, the test for a full buffer and the test for a collection interval time being exceeded are both performed. In another embodiment, each packet is individually processed to determine a network path delay, when the time between packet arrivals at 600 is greater than the time required to process the received packet.

A scaling function is determined at 630 to align a frequency of a host protocol clock to a monitoring point clock. In another embodiment, one of a frequency and a frequency drift are aligned. Referring to 630 and FIG. 4, in one embodiment a scaling function is determined by finding a linear fit though a series of clock factor data points (e.g. a ratio of a rate of the monitoring clock divided by a rate of the transport protocol clock). At 640, data points that are not sufficiently aligned to the linear fit are marked as unusable. In some embodiments unusable timestamps are replaced with a virtual timestamp.

A temporal offset is removed at 650. In another embodiment, one of temporal offset and a clock skew are removed. Referring to 650 and FIG. 3, in one embodiment, a temporal offset 290 is determined by minimizing a temporal delay variation 280. The determined temporal offset 290 is substantially equal to the transit delay 200 for a given packet size. Determining a minimized temporal delay is performed with one delay segment in one embodiment, and several delay segments in other embodiments.

At 660, a network path delay of one or more segments is estimated by calculating a difference in timing between a combination of end points defined by hosts with a corrected time stamp (e.g. resolved to the monitoring clock by scaling and removal of offsets), monitoring points or both. Depending upon whether the host clocks are usable, each packet will have zero to three associated path segment delay estimates. At 670, delay estimates are exported for generation of statistics and compression, and stored at 680 in a storage device. In some embodiments, the packets that are monitored at each monitoring point are also processed at the monitoring point and are accessed through a network management client process on the same host that last transmitted the packet. In some embodiments, packet information is obtained from network tap ports on routers. In other embodiments, the delay estimation methods described herein are used on stored packet data to estimate the delays experienced in the network at the time the data was collected, or at a different point from where the delay estimate is performed. In one embodiment, delay estimates from several monitoring points are combined to give a broader view of a network's path segment delays.

Figure 8:
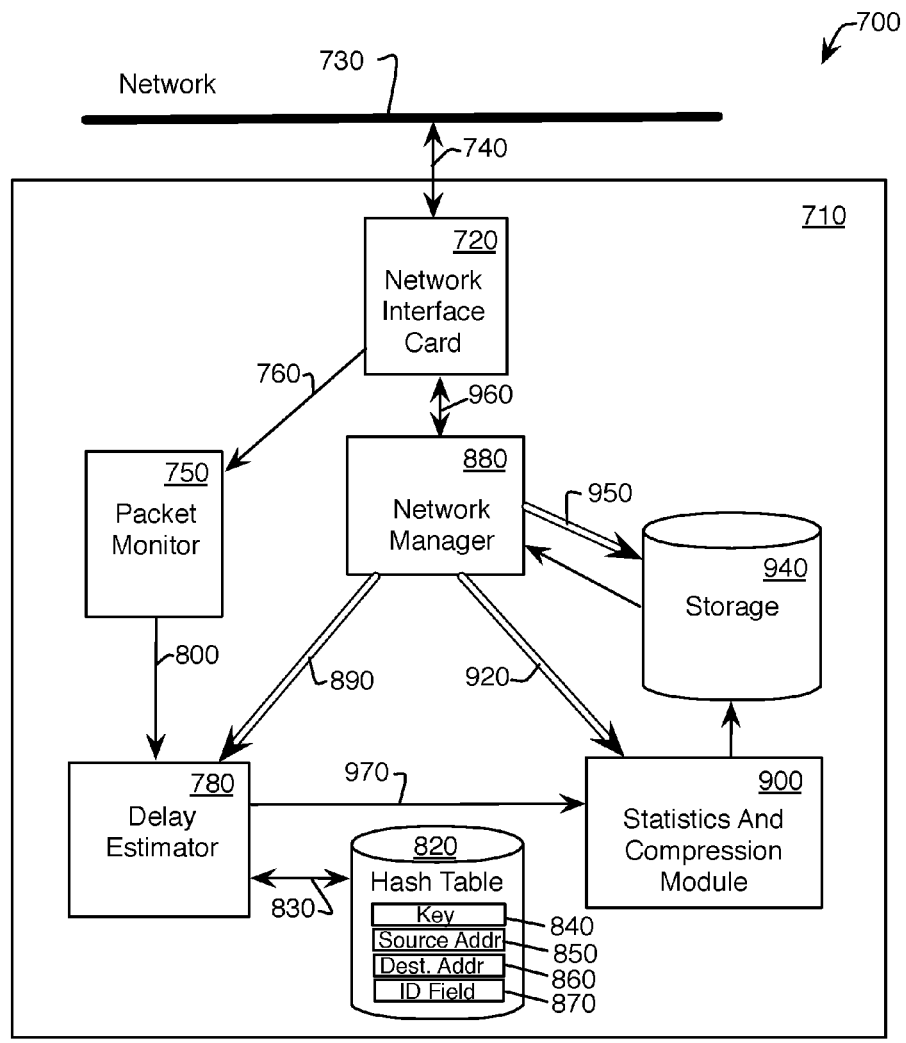
FIG. 8 is a schematic view of an embodiment of an apparatus for estimating network path segment delays in accordance with an embodiment of the present disclosure.

Referring to FIG. 8, an embodiment 700 of a system for monitoring network packets includes a monitoring point 710. In various embodiments, the monitoring point is one or more of MP0 40, MP1 50, and MP2 60. These monitoring points can be stand alone devices such as a modem (e.g. MP2 60), can run as processes on end hosts (e.g. MP1 50), or any other network attached device (e.g., a network router as shown by MP0 40). The monitoring point 710 includes a Network Interface Card 720 connected to a Network 730 through a connection 740. The Network Interface Card 720 is configured to monitor all packets passing by on the Network 730.

In one embodiment, the Network Interface Card 720 buffers received packets and passes packets when the buffer is full, or upon exceeding a predefined capture interval, to a Packet Monitor 750 over a connection 760. In another embodiment, the Network Interface Card 720 passes each packet received from the Network 730 directly to the Packet Monitor 750 for buffering in the Packet Monitor 750. In another embodiment, either the Network Interface Card 720 or the Packet Monitor 750 buffers only the packet header, or a subset of pertinent information from the packet header, (e.g. time stamps and information required for the hash table). In one embodiment, the Packet Monitor 750 is a passive monitor (e.g. a Berkeley Packet Filter). The Packet Monitor 750 uses the Network Interface Card 720 to capture all or a statistical sample of the packets on the Network 730. Packets that are well-formed, (e.g. TCP packets with TSval set), and contain the required identifier fields are passed on to a Delay Estimator 780, over a connection 800, for estimation of network path segment delays. In one embodiment, the arrival time at a monitoring point of a packet is stored with a Hash Table 820 over a connection 830. In one example, the Hash Table 820 includes a Key (e.g. Hash Table Key) 840, a source address 850 of the packet, a destination address 860 of the packet, and an Identifier (ID) field 870.

In various embodiments, a Network Manger 880 controls the operation and processes of the Delay Estimator 780 over a control path 890, a Statistics and Compression Module 900 over a control path 920, and a storage device 940 over a control path 950. The Network Manager 880 also communicates with the Network Interface Card 720 over a connection 960 to communicate data (e.g. delay estimates from the Delay Estimator 780, and Statistics and Compressed Data from the Storage) to the Network 730.

When delay estimates are obtained at 780, (using for example the method described in FIG. 7), at least one of the packets and their delay estimates are passed to a Statistics and Compression Module 900 over a connection 970. In one example, the Network Manger 880 determines if the packet delays estimates from the Delay Estimator 780 are too numerous and thereby directs the Statistics and Compression Module 900 to compress or summarize the packet data in a reduced form to save on storage requirements. In one example, packet data is compressed (e.g. reduced) and statistics summarized (e.g. with quantiles), and stored in the storage device 940 for a limited history of estimates and reductions. In one embodiment, the Statistics and Compression Module 900 aggregates separate delay estimates to construct delay estimates for longer paths or at higher levels of the system.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for estimation of a network path segment delay comprising:
   determining a scaling function to minimize a difference of at least one of a frequency and a frequency drift between a transport protocol clock of a first host and a monitoring clock of a monitoring point, the transport protocol clock providing a first time stamp for each packet of a plurality of packets, the first time stamp for each packet marking a temporal event of each packet at the first host and buffering the plurality of packets with a storage buffer;
   scaling the first time stamp for each packet with the scaling function to determine a first scaled time stamp for each respective packet;
   determining a temporal offset between the transport protocol clock and the monitoring clock for each packet by minimizing a temporal delay variation of the plurality of packets traversing a first segment between the first host and the monitoring point;
   removing the temporal offset from the first scaled time stamp for each packet to determine a first corrected time stamp for each respective packet; and
   estimating for each packet, the network path segment delay between the first host and the monitoring point by subtracting the first corrected time stamp for each packet from a first arrival time at the monitoring point for each respective packet, wherein a queuing delay is determined by subtracting a transit delay from the network path segment delay, the transit delay being a minimum of a previously stored network path segment delay.

2. The method of claim 1 wherein the scaling function is a linear fit to a time variant function of a ratio of a rate of the monitoring clock divided by a rate of the transport protocol clock.

3. The method of claim 1 further comprising marking the transport protocol clock as being unusable for estimating the network path segment delay in response to the time variant function deviating from the linear fit by a usability threshold.

4. The method of claim 1 further comprising storing the first arrival time at the monitoring point for each packet using a respective hash table key formed by combining a source address, a destination address, and an identifier field of each respective packet transmitted from the first host.

5. The method of claim 1 further comprising:
   storing the first arrival time at the monitoring point for each packet using a respective first hash table key formed by combining a source address, a destination address, and the first time stamp of each respective packet transmitted from the first host,
   transmitting a second packet from a second host in response to the second host receiving a one of the plurality of packets from the first host, the second packet traversing a second segment between the second host and the monitoring point, the second packet including the respective first time stamp of the one of the plurality of packets from the first host and a second time stamp marking a departure of the second packet from the second host, and
   retrieving from the second packet, the first arrival time at the monitoring point of the one of the plurality of packets transmitted by the first host, by using a second hash table key formed by combining the second time stamp with the transposition of a source address of the second packet and a destination address of the second packet.

6. The method of claim 5 wherein estimating for each packet, the network path segment delay comprises one of:
   estimating the network path segment delay of a first path spanning from the monitoring point to the second host, by subtracting the first arrival time at the monitoring point of the one of the plurality of packets from a corrected second time stamp, the first arrival time being retrieved by using the second hash table key,
   estimating the network path segment delay of a second path spanning from the first host to the second host, by subtracting the first corrected time stamp of the one of the plurality of packets from the corrected second time stamp,
   estimating the network path segment delay of a third path spanning from the second host to the monitoring point, by subtracting the corrected second time stamp of the one of the plurality of packets from a second arrival time at the monitoring point of the second packet transmitted by the second host, and
   estimating the network path segment delay of a fourth path spanning from the first host to the second host and from the second host to the monitoring point, by subtracting the first corrected time stamp from the second arrival time.

7. The method of claim 6 wherein the first time stamp for the one of the plurality of packets from the first host is replaced with a virtual time stamp in response to the transport protocol clock of the first host being unusable for estimating network path segment delays, the network path segment delay of the second path measuring a second virtual delay from the monitoring point to the second host, and the network path segment delay of the fourth path measuring a fourth virtual delay from the monitoring point to the second host and from the second host to the monitoring point.

8. The method of claim 1 wherein the temporal offset is determined by minimizing the temporal delay variation from a sample of the plurality of packets.

9. The method of claim 1 wherein the temporal offset is updated when a new packet from the plurality of packets provides a temporal delay variation being less than a previous temporal delay variation.

10. The method of claim 1 wherein the temporal offset is determined by interpolating between a plurality of minimized temporal delay variations, wherein each temporal delay variation corresponds to a different packet size.

11. The method of claim 1 wherein the temporal offset is determined by minimizing the temporal delay variation of the plurality of packets traversing the first segment and a second segment between the monitoring point and a second host.

12. The method of claim 1 further comprising compressing the network path segment delay with previously stored network path segment delays.

13. A monitoring point device for estimation of a network path segment delay comprising:
    a delay estimator configured to:
    determine a scaled time stamp for each packet of a plurality of packets by scaling a time stamp for each respective packet to minimize a difference of at least one of a frequency and a frequency drift between a transport protocol clock of a host and a monitoring clock of a monitoring point, the time stamp for each packet provided by the transport protocol clock,
    determine a corrected time stamp for each packet by removing from the scaled time stamp for each respective packet, a temporal offset between the transport protocol clock and the monitoring clock by minimizing a temporal delay variation of the plurality of packets traversing a segment between the host and the monitoring point, and
    estimate the network path segment delay between the host and the monitoring point by subtracting the corrected time stamp for each packet from an arrival time at the monitoring point for each respective packet;
    a network interface card connecting the delay estimator to a network, the network configured to transport a plurality of packets from the host to the monitoring point; and
    a packet monitor configured to determine a usability of each packet for estimating network path segment delays including verification of an identifier field for each packet.

14. The device of claim 13 wherein the monitoring point device comprises at least one of a second host, a modem, and a router.

15. The device of claim 13 further comprising a network manager, a compression module and a storage device, the network manager configured to determine from the delay estimator a number of network path segment delay estimates for the plurality of packets, to control the compression of network path segment delay estimates with the compression module when the number exceeds a threshold, and to control the storage of the network path segment delay estimates with the storage device.

16. The device of claim 13 wherein the delay estimator is coupled to the monitoring point.

17. A method for estimation of a network path segment delay comprising:
    determining a first scaled time stamp for each packet of a plurality of packets by scaling a first time stamp for each respective packet to minimize a difference of at least one of a frequency and a frequency drift between a transport protocol clock of a first host and a monitoring clock of a monitoring point, the first time stamp for each packet provided by the transport protocol clock of the first host;
    determining a first corrected time stamp for each packet by removing from the first scaled time stamp for each respective packet, a temporal offset between the transport protocol clock and the monitoring clock by minimizing a temporal delay variation of the plurality of packets traversing a first segment between the first host and the monitoring point;
    storing a first arrival time at the monitoring point for each packet using a respective first hash table key formed by combining a source address, a destination address, and an identifier field of each respective packet transmitted from the first host;
    transmitting a second packet from a second host in response to the second host receiving a one of the plurality of packets from the first host, the second packet traversing a second segment between the second host and the monitoring point, the second packet including the respective first time stamp of the one of the plurality of packets from the first host and a second time stamp marking a departure of the second packet from the second host;
    retrieving from the second packet, the first arrival time at the monitoring point of the one of the plurality of packets transmitted by the first host, by using a second hash table key formed by combining the second time stamp with the transposition of a source address of the second packet and a destination address of the second packet; and
    estimating for each packet, the network path segment delay comprising one of:
    estimating the network path segment delay of a first path spanning from the monitoring point to the second host, by subtracting the first arrival time at the monitoring point of the one of the plurality of packets from a corrected second time stamp, the first arrival time being retrieved by using the second hash table key,
    estimating the network path segment delay of a second path spanning from the first host to the second host, by subtracting the first corrected time stamp of the one of the plurality of packets from the corrected second time stamp,
    estimating the network path segment delay of a third path spanning from the second host to the monitoring point, by subtracting the corrected second time stamp of the one of the plurality of packets from a second arrival time at the monitoring point of the second packet transmitted by the second host, and
    estimating the network path segment delay of a fourth path spanning from the first host to the second host and from the second host to the monitoring point, by subtracting the first corrected time stamp from the second arrival time.

\* \* \* \* \*